(12) United States Patent
Bakken et al.

(10) Patent No.: US 10,288,122 B2
(45) Date of Patent: May 14, 2019

(54) HVAC ACTUATOR ASSEMBLY

(71) Applicant: Honeywell International Inc., Morris Plains, NJ (US)

(72) Inventors: Tom Bakken, Apple Valley, MN (US); Matthew Decker, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 282 days.

(21) Appl. No.: 15/333,036

(22) Filed: Oct. 24, 2016

(65) Prior Publication Data
US 2017/0241479 A1    Aug. 24, 2017

Related U.S. Application Data

(60) Provisional application No. 62/297,722, filed on Feb. 19, 2016.

(51) Int. Cl.
*F16D 1/02* (2006.01)
*F16D 1/08* (2006.01)
(Continued)

(52) U.S. Cl.
CPC ............. *F16D 1/02* (2013.01); *F16D 1/087* (2013.01); *F16D 1/10* (2013.01); *F16D 1/101* (2013.01);
(Continued)

(58) Field of Classification Search
CPC ... F16D 1/02; F16D 1/087; F16D 1/10; F16D 1/101; F16D 2001/103; F16D 1/072;
(Continued)

(56) References Cited

U.S. PATENT DOCUMENTS 9,123 A    7/1852  Turner
14,795 A   5/1856  Buss
(Continued)

FOREIGN PATENT DOCUMENTS

EP    0612950 A1    8/1994
EP    1235128 A2    8/2002
(Continued)

OTHER PUBLICATIONS

"Smart-T and MT-Adapt-HW Mounting Adapter," 1 page, prior to Feb. 23, 2011.
(Continued)

*Primary Examiner* — Amber R Anderson
*Assistant Examiner* — Nahid Amiri
(74) *Attorney, Agent, or Firm* — Seager, Tufte & Wickhem LLP

(57) ABSTRACT

A low profile shaft adaptor for coupling an output drive member of an HVAC actuator with an input drive member of a valve. The shaft adaptor may include a clamp for selectively clamping onto the input drive member of the valve, a drive interface configured to form an interference fit with an output drive member of the HVAC actuator, and a bracket configured to mechanically couple the drive interface and the clamp such that rotational movement of the drive interface by way of the interference fit with the output drive member of the HVAC actuator causes corresponding rotational movement of the clamp and thus the input drive member of the valve.

16 Claims, 15 Drawing Sheets

(51) Int. Cl.
*F24F 13/00* (2006.01)
*F16K 31/04* (2006.01)
*F16K 31/05* (2006.01)
*F16D 1/10* (2006.01)

(52) U.S. Cl.
CPC .......... *F16K 31/041* (2013.01); *F16K 31/055* (2013.01); *F24F 13/00* (2013.01); *F16D 2001/103* (2013.01)

(58) Field of Classification Search
CPC .......... F16D 1/08; F16D 1/0894; F16D 1/108; F16D 1/112; F16D 1/116; F16K 31/041; F16K 31/055; F24F 13/00; F16C 2226/12; F16C 2226/80; Y10T 403/7182; Y10T 403/7188
USPC .................. 403/398, 399; 464/147, 153, 182
See application file for complete search history.

(56) References Cited

U.S. PATENT DOCUMENTS

| | | | |
|---|---|---|---|
| 214,538 A | 4/1879 | Westermaier | |
| 1,414,354 A | 5/1922 | Gibbs | |
| 1,879,099 A | 9/1932 | Coffey | |
| 1,969,827 A | 8/1934 | Tautz | |
| 2,146,765 A * | 2/1939 | Ricefield | F16D 3/68 464/182 |
| 2,181,888 A * | 12/1939 | Gustin | F16D 3/60 254/10 R |
| 2,213,277 A * | 9/1940 | Guy | F16D 3/68 464/182 |
| 2,254,486 A * | 9/1941 | Kauffman | F16D 3/20 464/153 |
| 2,356,572 A * | 8/1944 | Dornig | F16D 3/68 464/139 |
| 2,428,688 A | 10/1947 | Stischer | |
| 2,563,582 A * | 8/1951 | Colucci et al. | B24B 27/00 409/185 |
| 2,616,452 A | 11/1952 | Clay et al. | |
| 3,117,257 A | 1/1964 | Stone | |
| 3,262,027 A | 7/1966 | Zaleske et al. | |
| 3,295,079 A | 12/1966 | Brown | |
| 3,468,138 A * | 9/1969 | Downey | F16D 3/74 464/182 |
| 3,595,505 A | 7/1971 | Burwell | |
| 3,625,503 A * | 12/1971 | Hall | B25B 1/20 269/142 |
| 3,727,160 A | 4/1973 | Churchill | |
| 3,776,275 A | 12/1973 | Updike | |
| 3,849,008 A | 11/1974 | Boucher et al. | |
| 3,880,534 A | 4/1975 | Schmidt | |
| 4,276,692 A | 7/1981 | Casler et al. | |
| 4,327,608 A | 5/1982 | Keys | |
| 4,354,399 A | 10/1982 | Katayama | |
| 4,433,218 A | 2/1984 | Provencher | |
| 4,487,634 A | 12/1984 | Turbak et al. | |
| 4,490,081 A | 12/1984 | Kuchuk-Yatsenko et al. | |
| 4,527,440 A | 7/1985 | Heitman et al. | |
| 4,549,446 A | 10/1985 | Beeson | |
| D286,907 S | 11/1986 | Strebe | |
| 4,671,540 A | 6/1987 | Medvick et al. | |
| 4,683,453 A | 7/1987 | Vollmer et al. | |
| D295,280 S | 4/1988 | Walser | |
| 4,744,783 A * | 5/1988 | Downey | F16D 3/79 464/147 |
| 4,805,870 A | 2/1989 | Mertz | |
| 4,810,213 A | 3/1989 | Chabot | |
| 4,836,497 A | 6/1989 | Beeson | |
| 4,887,634 A | 12/1989 | Killian | |
| 5,026,197 A * | 6/1991 | Johnson | B29C 45/1775 403/24 |
| 5,118,078 A | 6/1992 | Younker | |
| 5,133,265 A | 7/1992 | Lahti et al. | |
| 5,187,916 A | 2/1993 | Errani et al. | |
| 5,223,679 A | 6/1993 | Yoo | |
| 5,241,292 A | 8/1993 | Bjorknas et al. | |
| 5,326,006 A | 7/1994 | Giard, Jr. | |
| 5,509,752 A | 4/1996 | Kocisek | |
| 5,518,462 A | 5/1996 | Yach | |
| 5,540,414 A | 7/1996 | Giordani et al. | |
| 5,544,970 A | 8/1996 | Studer | |
| 5,551,477 A | 9/1996 | Kanno et al. | |
| 5,564,461 A | 10/1996 | Raymond, Jr. et al. | |
| 5,581,222 A | 12/1996 | Pinaud | |
| 5,634,486 A | 6/1997 | Hatting et al. | |
| 5,638,927 A | 6/1997 | Cheatham et al. | |
| 5,651,631 A | 7/1997 | Carmien | |
| 5,765,466 A | 6/1998 | Plantan et al. | |
| 5,806,555 A | 9/1998 | Magno, Jr. | |
| 5,808,534 A | 9/1998 | Laffey | |
| 5,887,608 A | 3/1999 | Bordelon et al. | |
| 5,896,959 A | 4/1999 | Jeffries et al. | |
| 5,911,595 A | 6/1999 | Orr, Jr. et al. | |
| 5,954,088 A | 9/1999 | Huang | |
| 5,971,378 A | 10/1999 | Sweeney | |
| 6,073,907 A | 6/2000 | Schreiner, Jr. et al. | |
| 6,079,704 A | 6/2000 | Buck | |
| 6,322,282 B1 | 11/2001 | Kussman et al. | |
| 6,422,258 B1 | 7/2002 | DuHack et al. | |
| 6,505,991 B2 * | 1/2003 | Roman | F16D 1/0847 403/256 |
| D480,450 S | 10/2003 | Saadi et al. | |
| 6,644,999 B1 | 11/2003 | Tan et al. | |
| 6,655,919 B2 | 12/2003 | Rossi et al. | |
| 6,684,901 B1 | 2/2004 | Cahill et al. | |
| 6,742,765 B2 | 6/2004 | Takano et al. | |
| 6,789,781 B2 | 9/2004 | Johnson et al. | |
| D498,821 S | 11/2004 | Nortier | |
| 6,837,646 B1 | 1/2005 | Minger | |
| 6,848,672 B2 | 2/2005 | Cross et al. | |
| 6,880,806 B2 | 4/2005 | Haikawa et al. | |
| 6,932,319 B2 | 8/2005 | Kowalski | |
| 6,935,615 B2 | 8/2005 | McCarty | |
| 6,994,320 B2 | 2/2006 | Johnson et al. | |
| 7,025,328 B2 | 4/2006 | Ulicny et al. | |
| 7,048,251 B2 | 5/2006 | Schreiner | |
| 7,074,087 B2 | 7/2006 | Szczesny et al. | |
| 7,128,192 B2 | 10/2006 | Fox | |
| 7,131,635 B2 | 11/2006 | Oh | |
| 7,186,133 B1 | 3/2007 | Szczesny | |
| 7,188,481 B2 | 3/2007 | DeYoe et al. | |
| D543,003 S | 5/2007 | Helmetsie | |
| 7,234,963 B1 | 6/2007 | Huang | |
| D571,290 S | 6/2008 | Gebhart et al. | |
| 7,395,718 B2 | 7/2008 | Obermeier | |
| D587,211 S | 2/2009 | Greenslade | |
| 7,494,376 B1 | 2/2009 | Foltz | |
| 7,507,108 B2 | 3/2009 | Tsuji | |
| D610,655 S | 2/2010 | Schmidt | |
| D614,150 S | 4/2010 | Crites | |
| 7,704,008 B2 | 4/2010 | Shinozaki et al. | |
| 7,708,254 B2 | 5/2010 | Hertzog | |
| 7,798,170 B2 | 9/2010 | Hotz | |
| D629,871 S | 12/2010 | Marinoni et al. | |
| 7,871,288 B1 | 1/2011 | Lee | |
| D650,337 S | 12/2011 | Bonomi | |
| D654,523 S | 2/2012 | Iranyi et al. | |
| 8,287,207 B2 * | 10/2012 | Bakken | F16D 13/10 403/261 |
| D697,585 S | 1/2014 | Liu et al. | |
| 8,632,054 B2 | 1/2014 | Carlson et al. | |
| 8,733,735 B2 | 5/2014 | Strebe | |
| 8,789,807 B2 | 7/2014 | Kreuter | |
| 8,887,655 B2 | 11/2014 | Carlson et al. | |
| 8,935,849 B2 | 1/2015 | Gross et al. | |
| 8,943,919 B2 * | 2/2015 | Windgassen | F24F 13/1426 403/256 |
| 8,968,023 B1 | 3/2015 | Walters et al. | |
| 9,016,662 B2 | 4/2015 | Staffiere et al. | |
| 9,423,818 B2 | 8/2016 | Gibbons, Jr. et al. | |
| 9,723,783 B2 * | 8/2017 | Patterson | A01D 41/1217 |
| 2003/0213662 A1 | 11/2003 | Fox | |

(56) References Cited

U.S. PATENT DOCUMENTS

| | | |
|---|---|---|
| 2004/0089835 A1 | 5/2004 | Schreiner |
| 2004/0099833 A1 | 5/2004 | Haikawa et al. |
| 2004/0173770 A1 | 9/2004 | Kowalski |
| 2004/0216912 A1 | 11/2004 | Osborn, Jr. |
| 2006/0131532 A1 | 6/2006 | Oh |
| 2006/0204322 A1 | 9/2006 | Roiser |
| 2007/0176068 A1 | 8/2007 | Kuo-Chen |
| 2009/0052982 A1* | 2/2009 | Bakken .................. F16D 13/10 403/261 |
| 2011/0240893 A1 | 10/2011 | Windgassen |
| 2012/0068099 A1* | 3/2012 | Sealy .................... F16K 31/055 251/291 |
| 2012/0119131 A1* | 5/2012 | Strebe .................. F16K 31/043 251/356 |
| 2012/0199776 A1 | 8/2012 | Kreuter |
| 2012/0211688 A1 | 8/2012 | Carlson et al. |
| 2014/0224353 A1 | 8/2014 | Strebe |
| 2015/0167990 A1* | 6/2015 | Zakula ................ F21V 33/0088 454/293 |
| 2017/0350525 A1* | 12/2017 | Scaramucci .......... F16K 5/0647 |

FOREIGN PATENT DOCUMENTS

| | | |
|---|---|---|
| EP | 1672261 A1 | 6/2006 |
| EP | 1967777 B1 | 10/2009 |
| WO | 02077478 A1 | 10/2002 |
| WO | 2006121905 A2 | 11/2006 |
| WO | 2011066328 A1 | 6/2011 |
| WO | 2015108910 A1 | 7/2015 |

OTHER PUBLICATIONS

Honeywell, "MT4-024MT4-230 MT8-024/MT8-230 Small Linear Thermoelectric Actuators," Product Data, 5 pages, 2009.
Honeywell, "MT-CLIP—Mounting Clips for MT4/MT8," 1 Page, prior to Feb. 23, 2011.
Honeywell, "MT-CLIP-ATP Mounting Clips for MT4MT8," 2 pages, 2006.
Honeywell, "Small Linear Thermostat Actuator, MT4-024/MT4-230/MT8-024/MT8230," Mounting Instructions, 2 pages, 2006.
Honeywell, "VC6800, VC6900 Series Floating Control Valves," Product Data, 6 pages, Nov. 1996.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "ML6420A30xx/ML7420A60xx," Electric Linear Valve Actuators, Installation Instructions, 2 pages, 2010.
Honeywell, "ML6435B/ML7435E Electric Linear Actuators for Floating/Modulating Control," Installation Instructions, 2 pages, 2008.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, "M7061 Installation Instructions," 2 pages, 2003.
Honeywell, M5003A, 2 pages, Sep. 2010.
Honeywell, M6410C/L M7410C, 2 pages, prior to Feb. 23, 2011.
Honeywell, "N20010, N34010 Non-Spring Return Damper Actuator 20/34 Nm (177/300 lb-in) for Modulating Control, Product Data," 7 pages, 2013.
Search Report for EP Application No. 12156608.7-2422 dated Jun. 1, 2012.

* cited by examiner

HVAC ACTUATOR ASSEMBLY

This application claims the benefit of U.S. Provisional Patent Application No. 62/297,722, filed Feb. 19, 2016, and entitled "Valve Actuator Assembly".

TECHNICAL FIELD

The present disclosure generally relates to HVAC systems, and more particularly to actuators for actuating HVAC devices of HVAC systems.

BACKGROUND

Heating, Ventilation and/or Air Conditioning (HVAC) systems are commonly used to condition air within buildings and other structures. Such HVAC systems often include a heat source such as a furnace or a boilers, a cooler such as an air conditioner, a ventilator, one or more controllers and/or other HVAC devices. Some HVAC systems include one or more actuatable devices, such as valves and/or other actuatable devices. Such valves may include, for example, air dampers, water valves, gas valves, ventilation flaps, louvers, and/or any other suitable device that may help regulate or control the flow of fluid (liquid or gas).

Many HVAC systems include devices that are located in tight spaces, such as behind industrial process equipment, within walls, crawl spaces, or attic spaces of a building or other structure. These areas are often poorly illuminated and/or cramped, leaving little room for installation and/or maintenance. Access for tools or even a second hand can often be difficult and problematic. A similar problem often exists for actuatable valves and/or other equipment used in industrial processes. What would be desirable is a connector that facilitates connecting an actuator output drive member and an input drive member of a valve or the like in order to promote easier installation and/or maintenance in the field, especially in cramped and/or poorly illuminated areas.

SUMMARY

The present disclosure generally relates to HVAC systems, and more particularly to actuators for actuating HVAC devices of HVAC systems. In one example, a shaft adaptor may be configured to mechanically couple an output drive member of an actuator with an input drive member of a component. The shaft adaptor may include a housing that has a first plate, a second plate spaced from the first plate, and a third plate interconnecting the first plate and the second plate. The second plate and the third plate of the housing may each include an aperture. The shaft adaptor may further include an inner jaw releasably coupled to the housing. The inner jaw may include a first plate including a side arm, a second plate spaced from the first plate, and a third plate interconnecting the first plate and the second plate of the inner jaw. The second plate of the inner jaw may extend through the aperture in the third plate of the housing and between the first plate and the second plate of the housing. The first plate of the inner jaw may extend along an outer side of the second plate of the housing. The third plate of the inner jaw may include an aperture. The side arm of the first plate of the inner jaw may extend toward the second plate of the inner jaw and into the aperture in the second plate of the housing. The shaft adaptor may further include an outer jaw comprising a ring and an elongate member extending from the ring. The elongate member may be configured to extend through the aperture in the third plate of the inner jaw and through the aperture in the third plate of the housing. The shaft adaptor may further include a clamping mechanism configured to move the outer jaw relative to the inner jaw when manipulated by a user.

In another example, a shaft adaptor may be configured to couple an output drive member of an HVAC actuator with an input drive member of an HVAC component, such as a valve. The shaft adaptor may include a clamp for selectively clamping onto an input drive member of a HVAC component, a drive interface configured to form an interference fit with an output drive member of a HVAC actuator, and a bracket configured to mechanically couple the drive interface and the clamp such that rotational movement of the drive interface by way of the interference fit with the output drive member of the HVAC actuator causes corresponding rotational movement of the clamp and thus the input drive member of the HVAC component.

In another example, a shaft adaptor may be configured to couple an output drive member of an actuator with an input drive member of a component. The shaft adaptor may include a clamp for selectively clamping onto an input drive member of a component, a drive interface configured to form an interference fit with an output drive member of an actuator, and a housing configured to mechanically couple the drive interface and the clamp. The housing may include a U shaped bracket with two spaced legs connected by a support, wherein a first one of the two spaced legs mechanically supports the clamp and a second one of the two spaced legs mechanically supports the drive interface. The clamp may include a U shaped bracket with two spaced legs connected by a support, wherein a first one of the two spaced legs of the U shaped bracket of the clamp extends through an opening in the support of the U shaped bracket of the housing and between the two spaced legs of the U shaped bracket of the housing. A second one of the two spaced legs of the U shaped bracket of the clamp may extend along an outer side of the second one of the two spaced legs of the U shaped bracket of the housing. The clamp may further include an outer jaw that extends between the first one of the two spaced legs of the U shaped bracket of the clamp and the second one of the two spaced legs of the U shaped bracket of the housing and through the opening in the support of the U shaped bracket of the housing and through an opening in the support of the U shaped bracket of the clamp.

The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
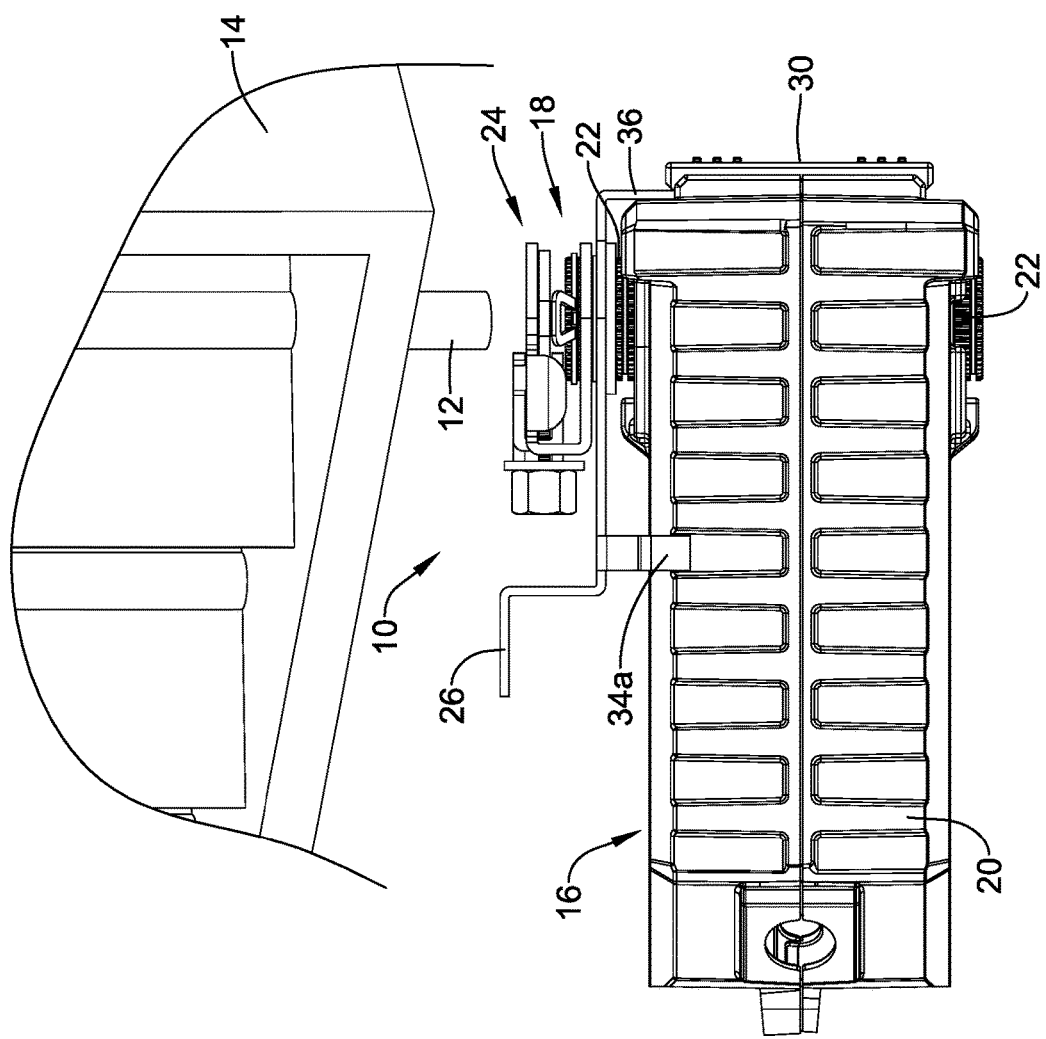
FIG. 1 is a perspective view of an illustrative HVAC valve actuator for driving an air damper of an HVAC system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

FIG. 1 is a perspective view of an illustrative but non-limiting valve actuator 10 for driving a valve shaft, such as a shaft 12 of an HVAC air damper 14. While FIG. 1 shows the valve actuator 10 driving a shaft 12 of an HVAC air damper 14, it is contemplated that the valve actuator may be used to drive any suitable valve (or other) shaft including but not limited to water valves within hydronic heating and/or cooling systems, other fluid or gas valves, and/or any other actuatable device as desired. The illustrative valve actuator 10 includes an actuator 16 and an actuator mounting assembly 18. The actuator 16 includes a housing 20 that contains an electric motor (not shown) for rotating a drive tube (not shown). In the example shown, a drive member 22 extends into the drive tube (not shown). The drive tube may have splines, grooves, teeth or other features on the inside surface to engage corresponding splines, grooves, teeth or other features on the outer surface of the drive member 22 so that rotational force of the drive tube may be transferred to the drive member 22. In some cases, and as shown in FIG. 1, the drive tube may extend through the housing 20 and out the other side, such that the drive member 22 may engage the other side of the drive tube of the actuator 16 if desired, such as when it is desirable to change the orientation of the actuator 16 relative to the actuator mounting assembly 18 (e.g. when it is desirable to reverse the drive direction of the drive member 22).

In the example shown, the actuator mounting assembly 18 combines a shaft adapter 24 and an anti-rotation bracket 26. The shaft adapter 24 may be a self-centering shaft adapter or a non-self-centering shaft adapter. The shaft adapter 24 shown in FIG. 1 is a non-self-centering shaft adapter. With a non-self-centering shaft adapter, the shaft adapter 24 and anti-rotation bracket 26 may oscillate back and forth in a direction that is orthogonal to the axis of the shaft 12 as the shaft 12 is rotated by the actuator 16 by virtue of being off-center from the rotation axis of the shaft 12. In contrast, a self-centering shaft adapter automatically centers the shaft adapter with respect to the valve shaft as the shaft adapter is secured to the valve shaft. With a self-centering shaft adapter, the shaft adapter and anti-rotation bracket may remain relatively stationary relative to the valve shaft as the valve shaft is rotated by the actuator.

In some cases, the actuator mounting assembly 18 may be secured to the valve shaft 12 without the actuator 16 present. This can make it easier to mount the actuator mounting assembly 18, especially in cramped spaces. In some cases, the actuator 16 may be wired where it is convenient, and then moved to the actuator mounting assembly 18 and secured to the mounted actuator mounting assembly 18, sometimes with a simple snap attachment. In some cases, a button, lever or other mechanism 30 may release the actuator 16 from the actuator mounting assembly 18 for easy removal.

In some cases the actuator 16 and the actuator mounting assembly 18 are configured so that the actuator 16 may be mountable to the actuator mounting assembly 18 in two different orientations. In one orientation, the actuator 16 may rotate the valve shaft 12 via the actuator mounting assembly 18 in a clock-wise direction, and in the other orientation, the actuator 16 may rotate the valve shaft 12 in a counter-clock-wise direction. In the example shown in FIG. 1, the drive tube (not shown) of the actuator 16 may extend through the housing 20 and out the other side, such that the drive member 22 may engage the other side of the drive tube of the actuator 16 if desired, such as when it is desirable to change the orientation of the actuator 16 relative to the actuator mounting assembly 18 (e.g. when it is desirable to reverse the drive direction of the drive member 22). This may allow the shaft adapter 24 of the actuator mounting assembly 18 to engage the drive tube in each of two orientations of the actuator 16. The drive direction of the valve shaft 12 can be changed by simply pushing the button, lever or other mechanism 30 to release the actuator 16 from the actuator mounting assembly 18, re-orientate the actuator 16 (e.g. flipping the actuator 16 over 180 degrees), and then re-attached the actuator 16 to the actuator mounting assembly 18. This can typically be easily accomplished even in cramped spaces.

In the example shown, the anti-rotation bracket 26 includes side arms 34a that are configured to receive the housing 20 of the actuator 16. The illustrative anti-rotation bracket 26 also includes a front arm 36 with latching features. In the example shown, the front arm 36 is configured to extend into a slot in the front side of the housing 20 of the actuator 16. The actuator release lever 30, which in FIG. 1 toggles about pin (not explicitly shown), can be used to capture and release the latching features of the front arm 36 to secure and release the actuator 16 relative to the actuator mounting assembly 18.

Figure 2:
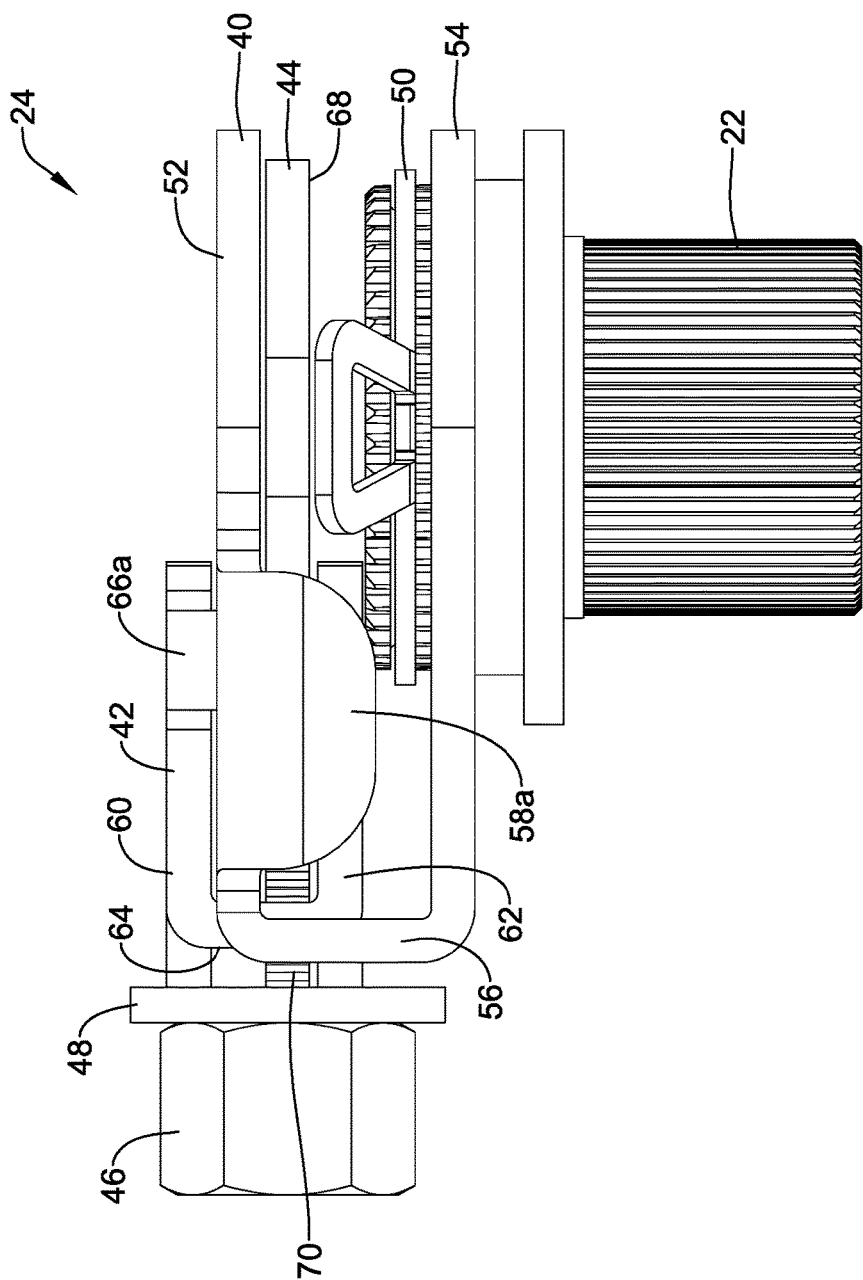
FIG. 2 is a side view of an illustrative shaft adaptor of FIG. 1.

FIG. 2 is a side view of the illustrative shaft adaptor 24 of FIG. 1 including the drive member 22. The shaft adaptor 24 may have a relatively low profile for connecting an output drive member (e.g. drive tube) of an actuator 16 to an input drive member, such as the shaft 12 of a damper 14. In the example shown in FIG. 2, the shaft adaptor 24 may include a housing 40, an inner jaw 42, an outer jaw 44, a clamping mechanism 46, a washer 48, and a removable clip 50. The housing 40 may be formed from a stamped sheet metal while the inner and outer jaws 42, 44 may be formed from a hardened steel. These are just examples. It is contemplated that the various components of the shaft adaptor 24 may be made from any material desired, including but not limited to polymers, metals, ceramics, composites, etc.

Figure 3:
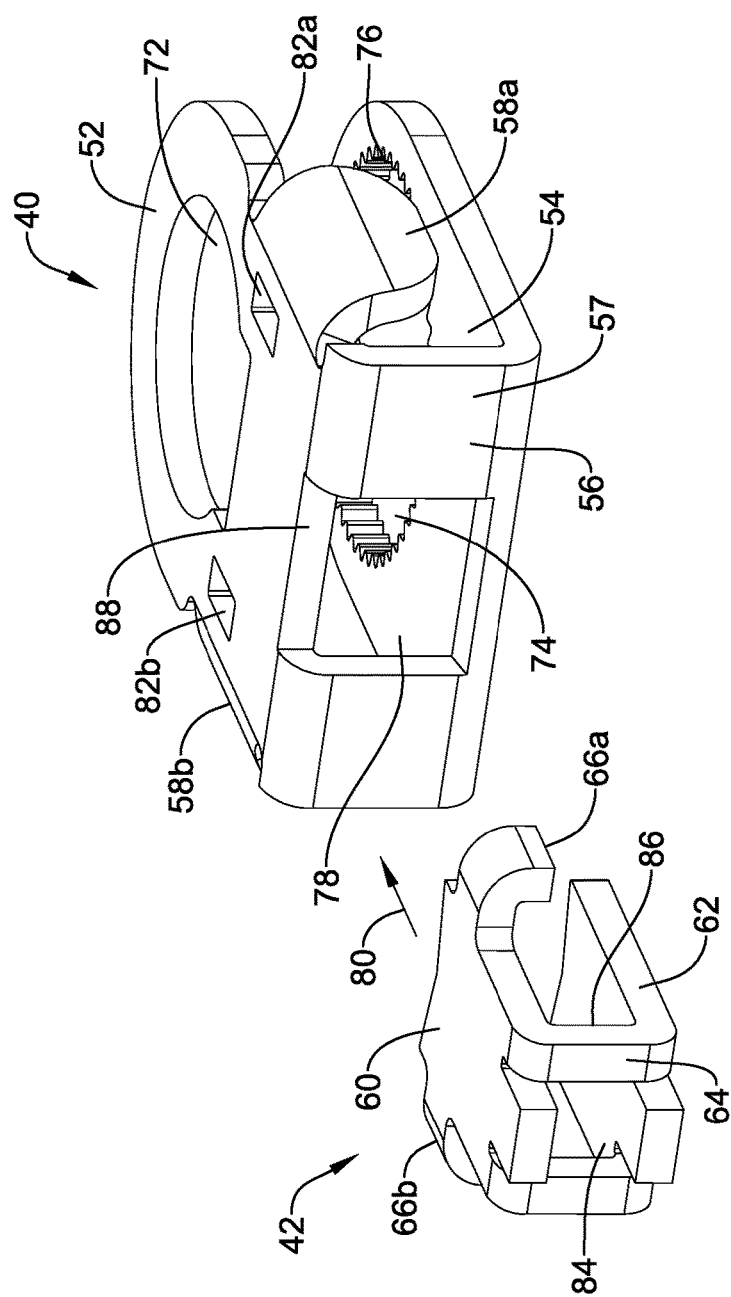
FIGS. 3-12 illustrate a method of assembling the illustrative shaft adaptor of FIG. 2.

In the example shown, the housing 40 may include a first plate 52, a second plate 54 spaced from the first plate 52, and a third plate 56 interconnecting the first plate 52 and the second plate 54. The housing may be a generally U-shaped bracket having two spaced legs (e.g., plates 52, 54) secured by an intermediate leg (e.g. third plate 56). As used herein, the first plate 52 of the housing 40 may be equivalent to one of the two spaced legs of the U-shaped bracket, the second plate 54 of the housing 40 may be equivalent to a second one of the two spaced legs. A pair of side arms 58a, 58b (collectively, 58) may extend from the first plate 52 and towards the second plate 54, sometimes at an angle generally orthogonal to the first plate 52. The inner jaw 42 may include a first plate 60, a second plate 62 spaced from the first plate 60, and a third plate 64 interconnecting the first plate 60 and the second plate 62. A pair of side arms 66a, 66b (collectively, 66) may extend from the first plate 60 and towards the second plate 62, sometimes at an angle generally orthogonal to the first plate 60. While the inner jaw 42 is described as including a pair of side arms 66, it is contemplated that the inner jaw 42 may include fewer than two (e.g., zero or one) side arms 66 or more than two side arms 66, as desired. The outer jaw 44 may further include a ring element 68 and an elongate member 70 extending from the ring 68. The relative positioning of the various components of the shaft adaptor 24 will be described with respect to FIGS. 3-12 which show an illustrative method of assembling the shaft adaptor 24. FIG. 3 illustrates a perspective view of the housing 40 and the inner jaw 42 in an unassembled configuration. As described herein, the housing 40 includes a first plate 52, a second plate 54 spaced from the first plate 52, and a third plate 56 interconnecting the first plate 52 and the second plate 54. A pair of side arms 58a and 58b may extend from the first plate 52 and towards the second plate 54, bending down to an angle generally orthogonal to the first plate 52. The first plate 52 may define a receiving aperture 72 extending through the first plate 52 and configured to receive the input drive member of the component (e.g., the shaft 12 of the damper 14). The first plate 52 may further include one or more apertures 82a, 82b (collectively, 82) formed therein. In some instances, the apertures 82 may extend through the first plate 52, while in other instances, the apertures 82 may be notches or recesses formed in, but not through, the first plate 52. The apertures 82 may be spaced from the receiving aperture 72 and from one another. In some cases, the apertures 82 may be configured to receive the side arms 66 of the inner jaw 42. While the housing 40 is described as including a pair of apertures 82, it is contemplated that the housing 40 may include fewer than two (e.g., zero or one) apertures 82 or more than two apertures 82, as desired. In some cases, the number of apertures 82 in the housing 40 may equal the number of side arms 66 on the inner jaw 42, although this is not required.

The second plate 54 of the housing 40 may define a receiving aperture 74 extending through the second plate 54 and configured to receive the output drive member 22. As will be described in more detail herein, the receiving aperture 74 in the second plate 54 may include a plurality of splines 76 defined in a wall thereof configured to engage mating splines on the outer surface of the drive member 22. The third plate 56 may define an aperture 78 extending through the third plate 56. The aperture 78 in the third plate 56 may be configured to receive the second plate 62 of the inner jaw 42 therethrough, as indicated at arrow 80.

As described herein, the inner jaw 42 may include a first plate 60, a second plate 62 spaced from the first plate 60, and a third plate 64 interconnecting the first plate 60 and the second plate 62. A pair of side arms 66 may extend from the first plate 60 and towards the second plate 62, bending down to an angle generally orthogonal to the first plate 60. When assembled, the side arms 66 may be received within the apertures 82 in the first plate 52 of the housing 40. The third plate 64 may define an aperture 84 extending through the third plate 64. The aperture 84 in the third plate 64 may be configured to receive the elongate member 70 of the outer jaw 44 therethrough.

Figure 4:
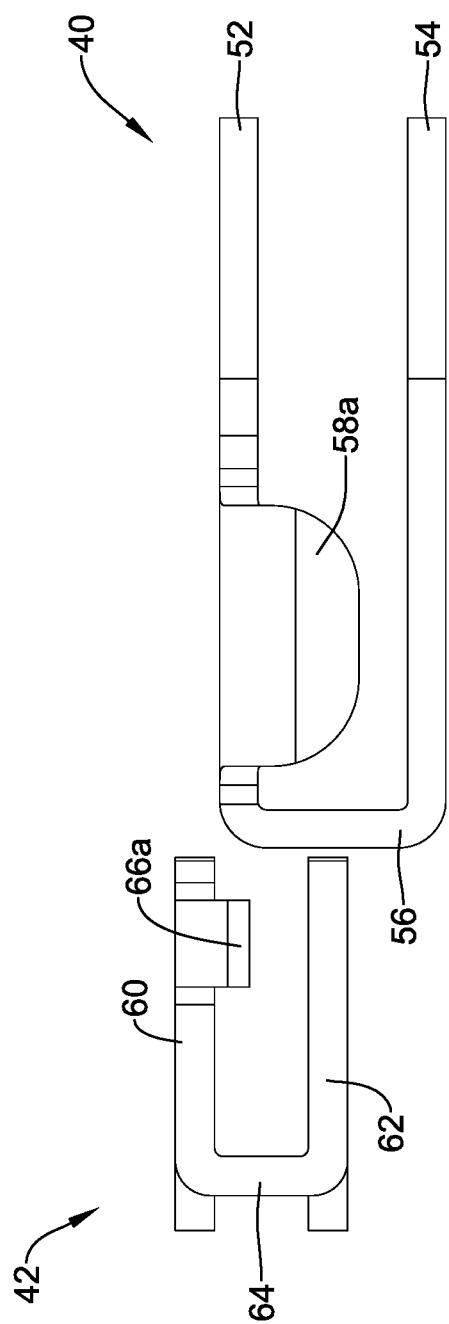
Figure 5:
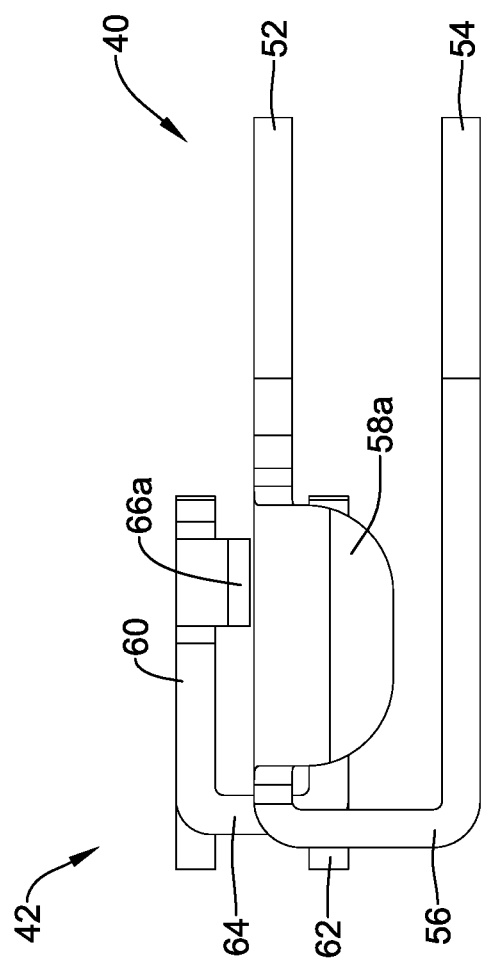

FIG. 4 illustrates a side view of the housing 40 and the inner jaw 42 in an unassembled configuration. To assemble the inner jaw 42 with the housing 40, the second plate 62 of the inner jaw 42 may be generally aligned with the aperture 78 in the third plate 56 of the housing 40. As shown in FIG. 5, the second plate 62 of the inner jaw 42 may be received within the aperture 78 in the third plate 56 of the housing 40. The inner jaw 42 may be advanced from an outer side 57 of the third plate 56 of the housing 40. The second plate 62 of the inner jaw 42 may be advanced into the aperture 78 in the third plate 56 of the housing 40 until an inner surface 86 of the third plate 64 of the inner jaw 42 engages a surface 88 of the first plate 52 of the housing 40 adjacent to the aperture 78 in the third plate 56 and/or until the side arms 66 are generally aligned with the apertures 82 in the first plate 52.

Figure 6:
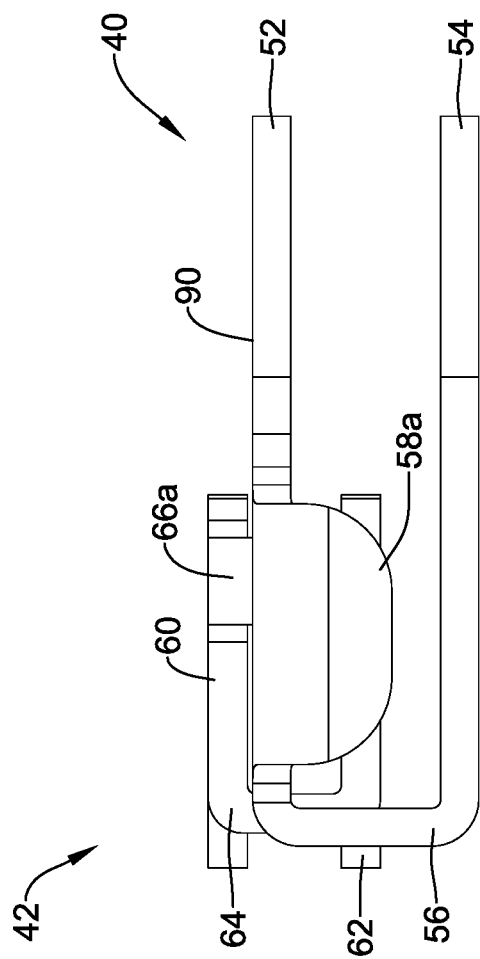
Figure 7:
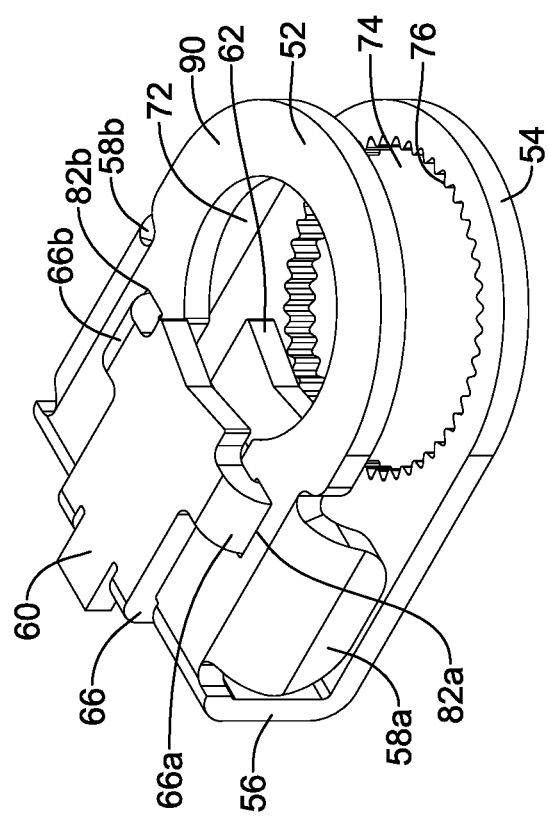

Once the side arms 66 are aligned with the apertures 82 in the first plate 52, the inner jaw 42 may be lowered such that the side arms 66 extend into the apertures 82 in the housing 40, as shown in FIG. 6 and FIG. 7. In this configuration, the first plate 60 of the inner jaw 42 may extend along an outer surface or side 90 of the first plate 52 of the housing 40. The second plate 62 of the inner jaw 42 may extend through the aperture 78 of the third plate 56 and between the first plate 52 and the second plate 54 of the housing 40.

Figure 8:
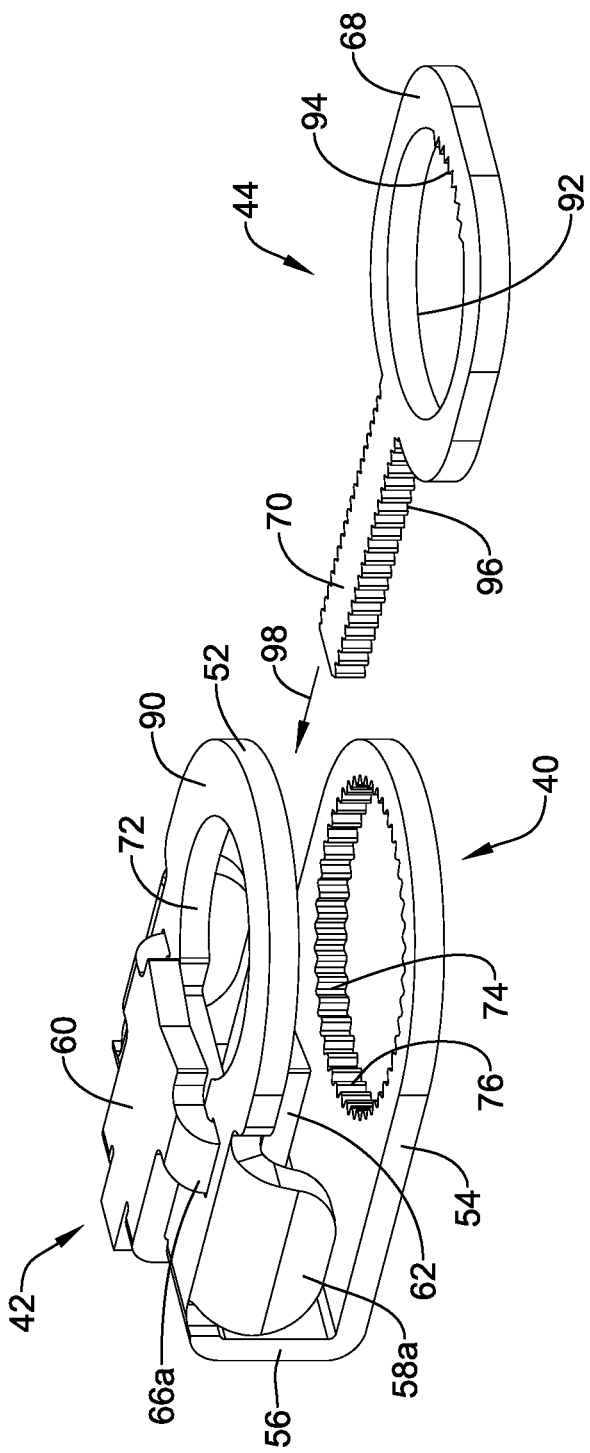

Once the inner jaw 42 is assembled with the housing 40, the outer jaw 44 may be inserted between the second plate 62 of the inner jaw 42 and the first plate 52 of the housing 40, in the direction shown at arrow 98. As can be seen, the outer jaw 44 may be assembled with the inner jaw 42 and the housing 40 in a direction (arrow 98) generally opposite from the direction (arrow 80) in which the inner jaw 42 is assembled with the housing 40. As best seen in FIG. 8, the outer jaw 44 may include a ring 68 and an elongate member 70 extending from the ring 68. The ring 68 may generally define an aperture 92 configured to receive a portion of an input drive member of a valve or the like (e.g. the shaft 12 of HVAC air damper 14). In some cases, the ring 68 may have a region including a plurality of spines 94. The splines 94 may be configured to help engage and secure the outer jaw 44 to the input drive member. The elongate member 70 may include a plurality of threads 96. The threads 96 may be configured to mate with corresponding threads on the clamping mechanism 46, as further described herein.

Figure 9:
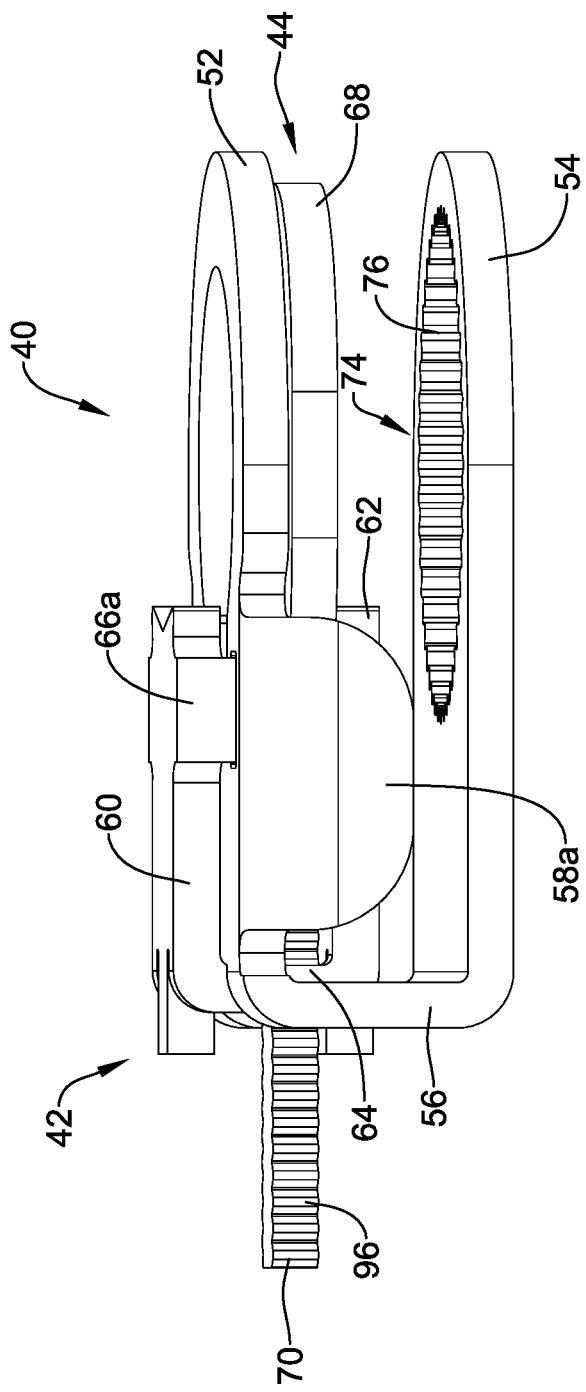
Figure 10:
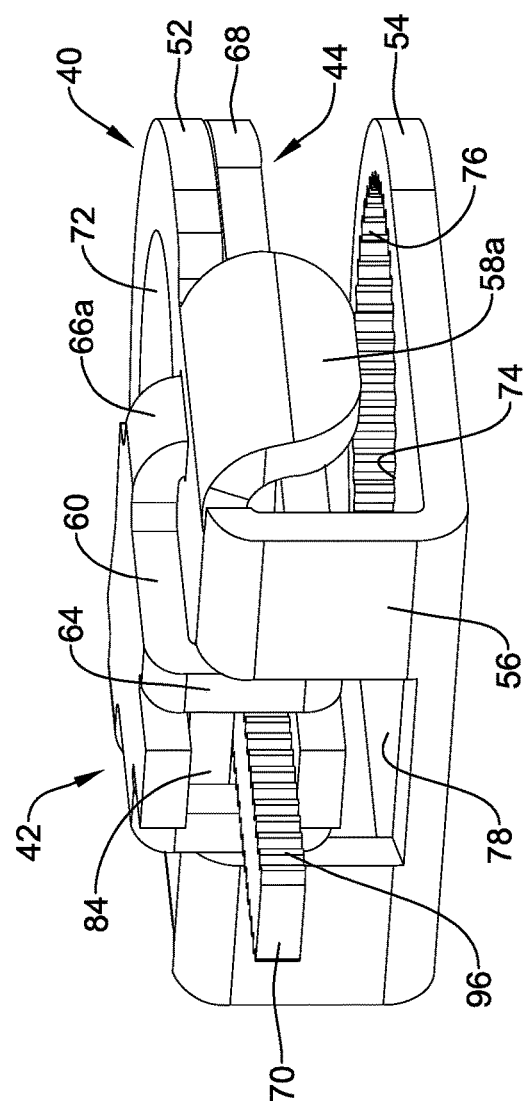

Referring to FIGS. 9 and 10, the elongate member 70 of the outer jaw 44 may be advanced in the direction of arrow 98 (see FIG. 8) and between the first and second plates 52, 54 of the housing 40. At least part of the outer jaw 44 (e.g., the elongate member 70 and/or the ring 68) may be inserted between the first plate 52 of the housing and the second plate 62 of the inner jaw 42. The elongate member 70 may be advanced through the aperture 78 in the third plate 56 of the housing 40 and the aperture 84 in the third plate 64 of the inner jaw 42. When the elongate member 70 of the outer jaw 44 extend through the apertures 74, 84 in the third plates 56, 64 of the housing 40 and the inner jaw 42, the inner jaw 42 may be held in place relative to the housing 40. In other words, when assembled the outer jaw 44 may prevent the inner jaw 42 from simply falling free from the housing 40.

Figure 11:
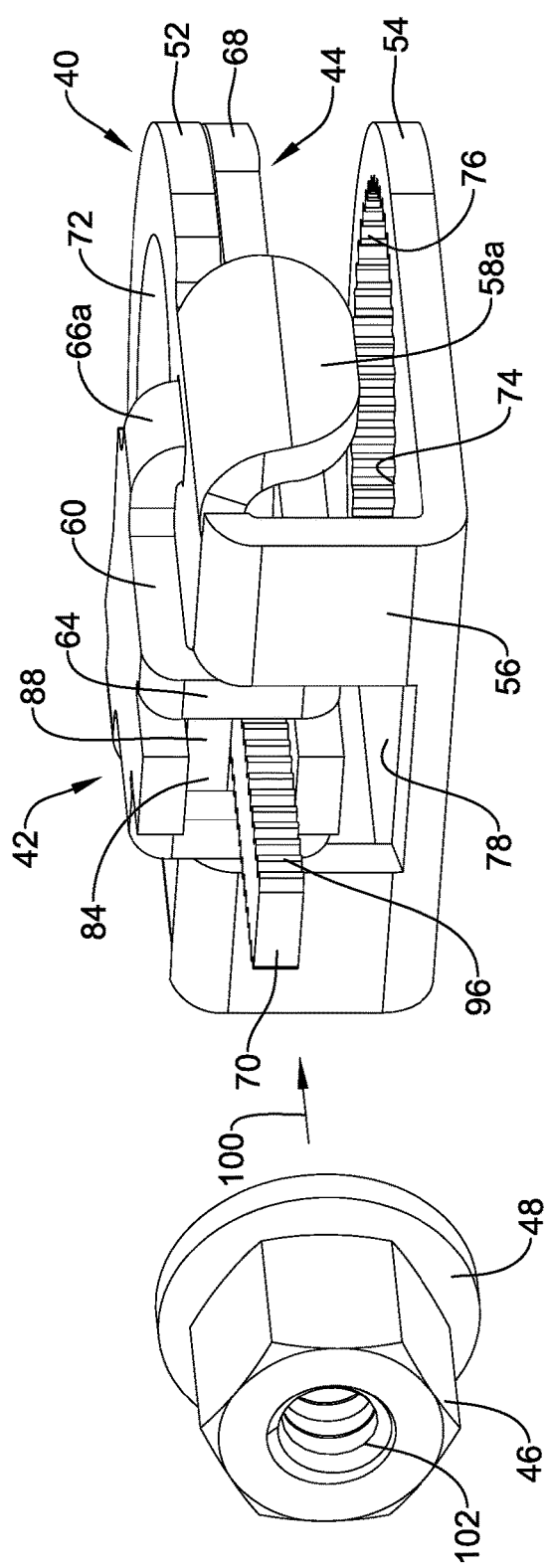
Figure 12:
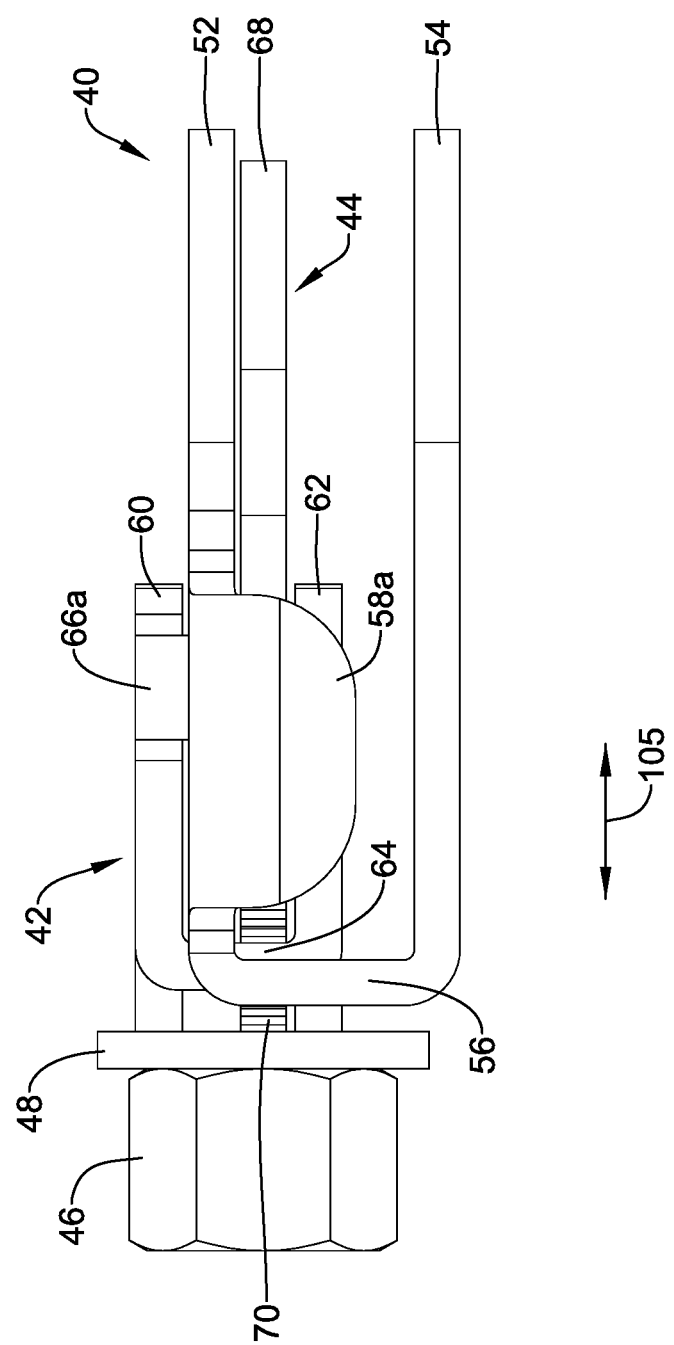

The outer jaw 44 may be secured relative to the housing through a clamping mechanism 46 as shown in FIGS. 11 and 12. In some instances, the clamping mechanism 46 may be a nut having a plurality of internal threads 102 used in combination with a washer 48. However, other removable clamping mechanisms 46 may be used. The internal threads 102 of the clamping mechanism 46 may be threadably engaged with the threads 96 on the elongate member 70 and may advance in the direction of arrow 100. The clamping mechanism 46 may allow from some longitudinal movement of the outer jaw 44 (e.g. in direction of arrow 105 of FIG. 12) relative to the inner jaw 42 when manipulated by the user. For example, the user may tighten or loosen (e.g., rotate) the clamping mechanism 46 to effect movement of the outer jaw 44 relative to the inner jaw 42.

Figure 13:
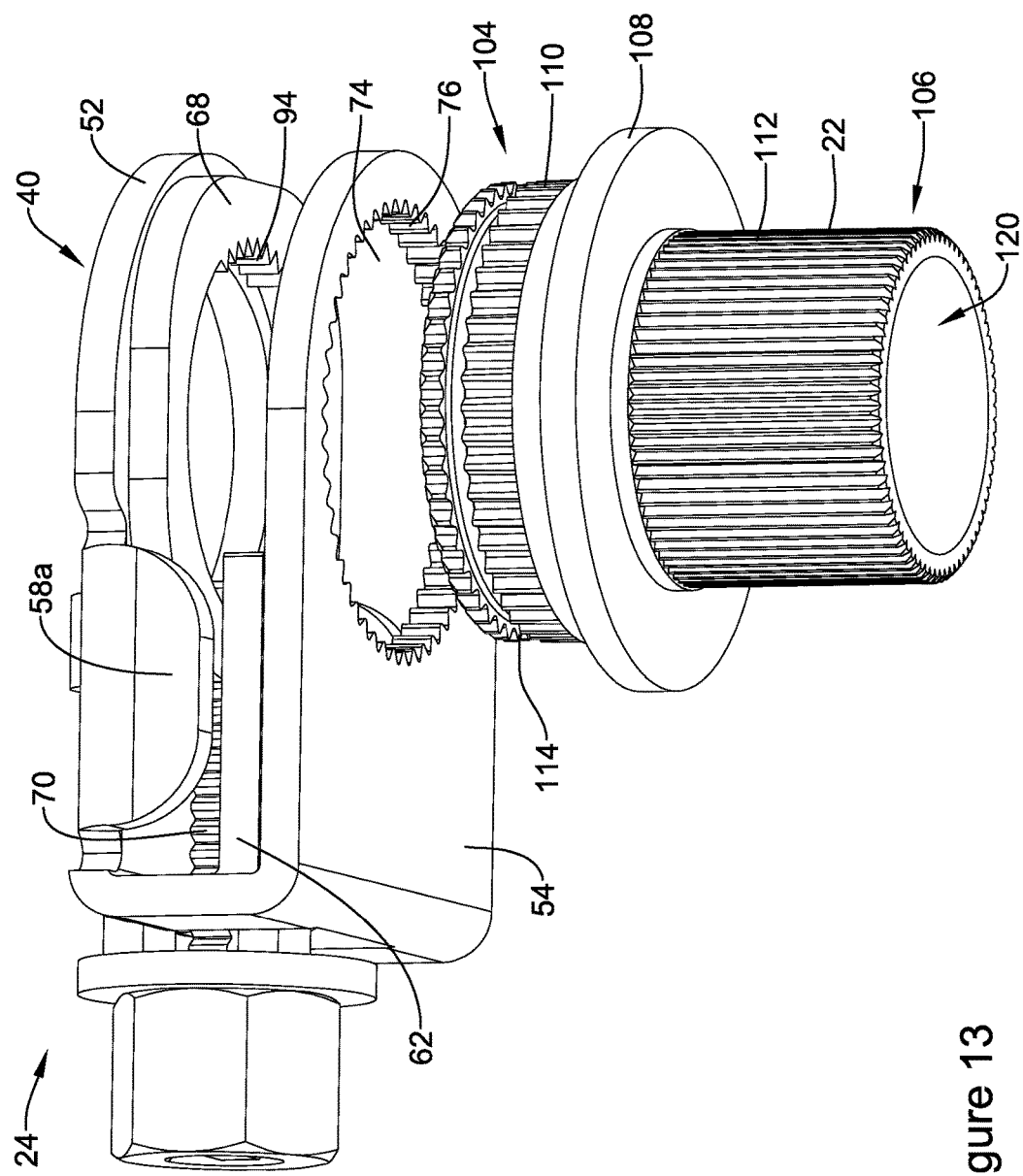
FIGS. 13 and 14 illustrate a method for assembling a shaft adaptor with an output drive member.
Figure 14:
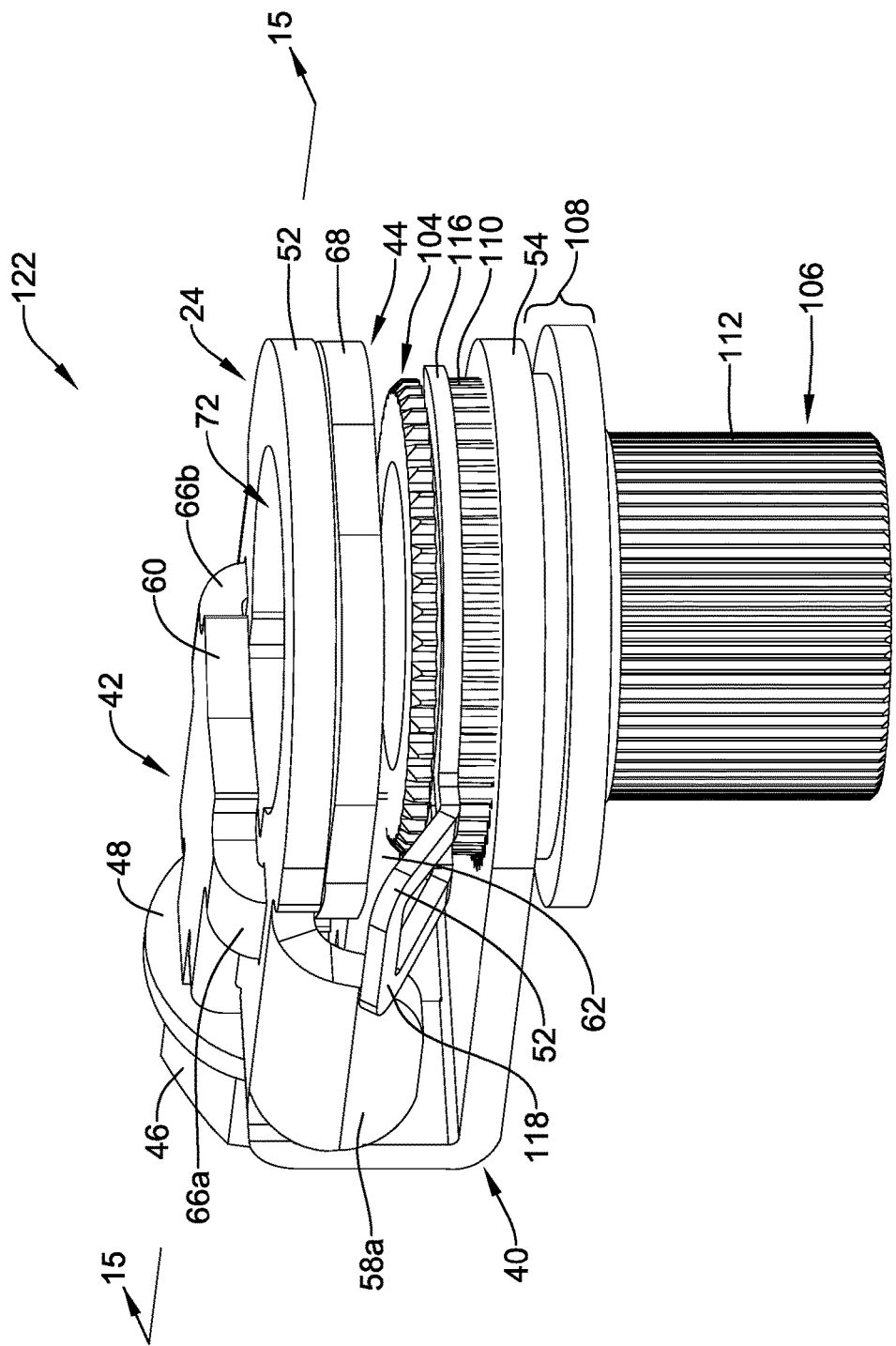

FIGS. 13 and 14 illustrate an example method for assembling the drive member 22 of the shaft adaptor 24. In the example shown, a portion of the output drive member 22 may be positioned to extend through the aperture 74 in the second plate 54 of the housing 40. The output drive member 22 may include an upper portion 104 and a lower portion 106 separated by an intermediate region 108. In some cases, the intermediate region 108 have a have a larger cross-section or diameter than the aperture 74 in the second plate 54 of the housing 40 to limit advancement of the output drive member 22 through the aperture 74. When so provided, the intermediate region 108 may function as a stop mechanism. The lower portion 106 may include a plurality of splines 112 on its outer surface to engage corresponding splines on an inner surface of a drive tube of the actuator 16. The upper portion 104 may include a plurality of splines 110 formed on an outer surface thereof and configured to engage the splines 76 in the aperture 74 of the second plate 54 of the housing 40. The splines 110 of the drive member 22 may form an interference fit with the splines 76 in the aperture 74 of the housing 40 and the splines 112 of the drive member 22 may form an interference fit with splines on the inner surface of a drive tube of an actuator 16.

The shaft adaptor 24 may be positioned at any rotational position about the drive tube of the actuator 14. For example, the number of rotational orientations of the shaft adaptor 24 relative to the drive member 22 may be limited only by the number of splines 112 on the outer surface of the lower portion 106 of the drive member 22. In one example, a drive member 22 having seventy two splines 112 on the lower portion 106 may allow for seventy-two different orientations of the shaft adaptor 24 relative to the drive member 22. The number of splines 110 on the upper portion 104 of the drive member 22 and/or the number of splines 76 in the receiving aperture 74 may also dictate how many positions that the housing 40 may be secured relative to the drive member 22. In some cases, the actuator stroke may be adjusted by removing the shaft adaptor 24 from the drive member 22 and repositioning it for the desired stroke reduction (or increase, as desires). The shaft adaptor 24 may impact stops on the actuator housing to stop the actuator at the desired limit position. In other words, the shaft adaptor 24 may be rotate about the drive member 22 to bring the shaft adaptor 24 closer to or farther from the stop on the actuator housing to adjust the actuator stroke.

Figure 15:
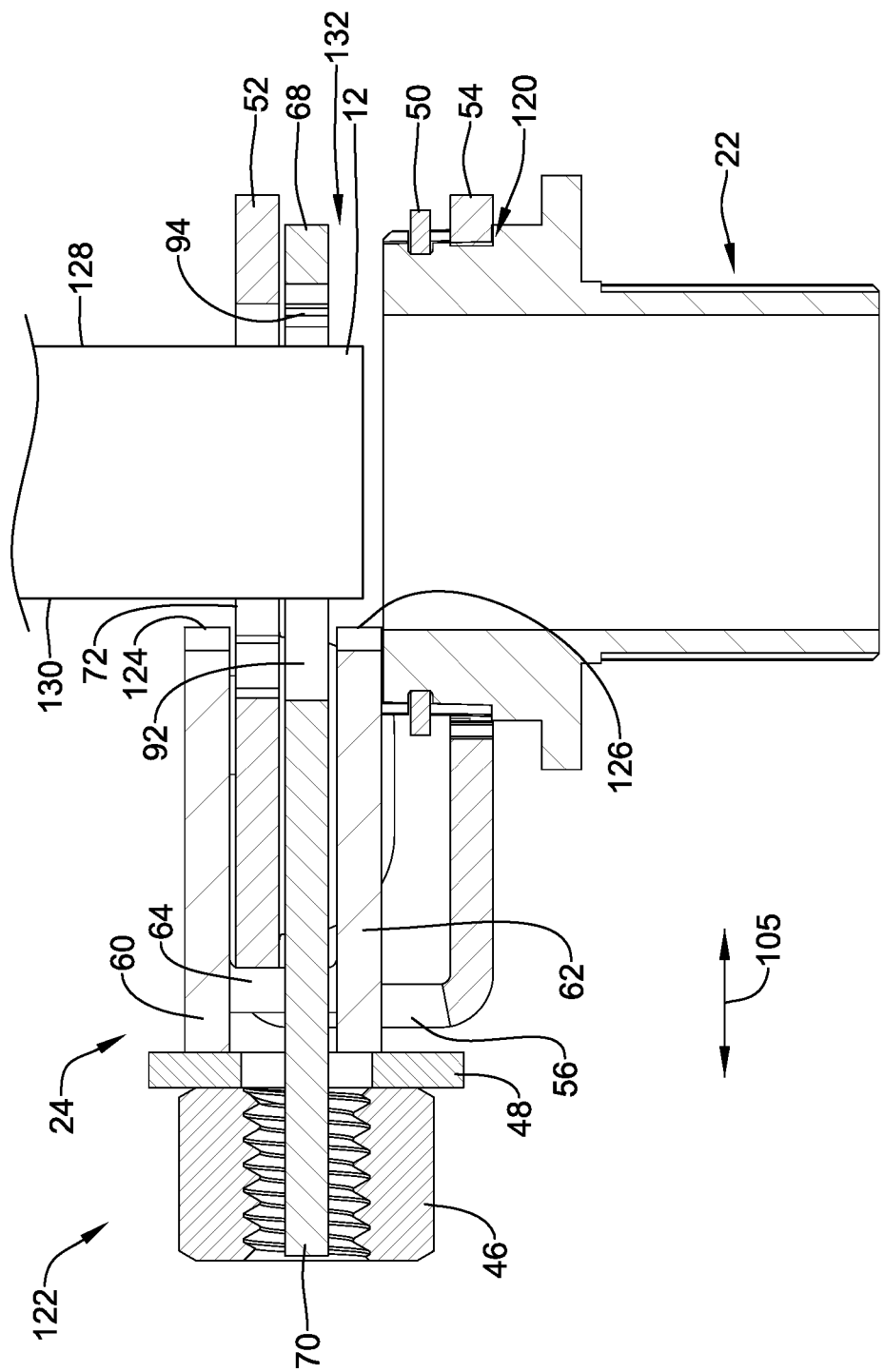
FIG. 15 is an assembled cross-sectional view of the illustrative shaft adaptor and actuator drive shaft of FIG. 14 including a valve shaft.

Once the shaft adaptor 24 has been positioned over the drive member 22, a removable clip 50 may be placed within a groove 114 of the drive member 22 to releasably secure the drive member 22 to the shaft adaptor 24 forming assembly 122 shown in FIGS. 14-15. In the example shown, the clip 50 may be positioned between the inner and outer jaws 42, 44 and a drive interface 120 to hold the drive member 22 in place relative to the drive interface 120 and thus the housing 40. The clip 50 may include a resilient (e.g. somewhat flexible) generally "C" shaped portion 116 configured to engage the groove 114 of the drive member 22 and a gripping portion 118. The gripping portion 118 may be sized and shaped to allow a user to grip the clip 50 and remove it without additional tools.

Once the shaft adaptor 24 has been assembled, the assembly 122 may be coupled with an input drive member (e.g., a shaft 12 on a damper 14). FIGS. 15 illustrates a cross-sectional view of the assembly 122 taken at line 15-15 in FIG. 14 with an input drive member 12 extending through aperture 72 in the first plate 52 of the housing 40 and into the aperture 92 formed by the ring 68 of the outer jaw 44. The clamping mechanism 46 may be manipulated (e.g., rotated, actuated, etc.) by the user (e.g., installer) to effect longitudinal movement 105 of the outer jaw 44. Longitudinal movement 105 of the outer jaw 44 may bring the splines 94 formed in the ring 68 into contact with a first lateral side 128 of the input drive member 12. The clamping mechanism 46 may be further manipulated until a second lateral side 130 (opposite from the first lateral side 128) of the input drive member 12 is brought into contact with edge surfaces 124, 126 of the first and second plates 60, 62 of the inner jaw 42. In some cases, the edge surfaces 124, 126 may have a generally "V" or angled surface to help grip the second lateral side 130 of the input drive member 12. The input drive member 12 is now rotationally secured relative to the drive member 22. In the example shown, the input drive member 12 may not directly interact and/or contact the drive member 22. In some cases, a central axis of the input drive member 12 may be offset from, but parallel to a central axis of the drive member 22. However, it is not required that the central axes of the input drive member 12 and the drive member 22 are offset from one another. In some instances, the central axes of the input drive member 12 and the drive member 22 may be coaxial with one another.

It is contemplated that the orientation of the inner and outer jaws 42, 44 may provide uniform clamping of the input drive member 12 (e.g., actuator shaft) and also provide the clearance needed for the splines 76 of the housing 40 to interface with the drive member 22. For example, together, the inner and outer jaws 42, 44 may form a clamp or clamping mechanism for clamping onto the input drive member 12 (which may be an input drive member of an HVAC component). The housing 40 may mechanically couple the clamp (e.g., inner and outer jaws 42, 44) to the drive member 22 (e.g., interface of the splines 76, 110) such that rotational movement of the drive member 22 causes corresponding rotational movement of the clamp and thus the input drive member of the HVAC component. The first plate 52 of the housing 40 (e.g. a first leg of a U-shaped bracket) may support the clamp (e.g., inner and outer jaws 42, 44) while the second plate 54 (e.g. a second leg of a U-shaped bracket) of the housing 40 may form a portion of and/or support the drive member 22. In some cases, the housing 40 may hold the drive member 22 (e.g., interface of the splines 76, 110) and the clamp (e.g., inner and outer jaws 42, 44) in spaced apart relationship resulting in a gap 132 between the clamp and the drive member 22.

EXAMPLES

In a first example, a shaft adaptor may be configured to mechanically couple an output drive member of an actuator with an input drive member of a component. The shaft adaptor may comprise a housing comprising a first plate, a second plate spaced from the first plate, and a third plate interconnecting the first plate and the second plate. The second plate and the third plate of the housing may each include an aperture. The shaft adaptor may further comprise an inner jaw releasably coupled to the housing. The inner jaw may a first plate including a side arm, a second plate spaced from the first plate, and a third plate interconnecting the first plate and the second plate of the inner jaw. The second plate of the inner jaw may extend through the aperture in the third plate of the housing and between the first plate and the second plate of the housing. The first plate of the inner jaw may extend along an outer side of the second plate of the housing. The third plate of the inner jaw may include an aperture. The side arm of the first plate of the inner jaw may extend toward the second plate of the inner jaw and into the aperture in the second plate of the housing. The shaft adaptor may further comprise an outer jaw comprising a ring and an elongate member extending from the ring. The elongate member may be configured to extend through the aperture in the third plate of the inner jaw and through the aperture in the third plate of the housing. The shaft adaptor may further include a clamping mechanism configured to move the outer jaw relative to the inner jaw when manipulated by a user.

Alternatively or additionally to any of the examples above, in another example, the first plate and the second plate of the housing may each define a receiving aperture, wherein the receiving aperture of the first plate of the housing may be configured to receive the input drive member of the component, and the receiving aperture of the second plate may be configured to receive the output drive member of the actuator.

Alternatively or additionally to any of the examples above, in another example, the receiving aperture in the second plate of the housing may comprise a plurality of splines configured to engage a plurality of splines on an output drive member of the actuator.

Alternatively or additionally to any of the examples above, in another example, the shaft adaptor may further comprise a removable clip configured to releasably secure the output drive member of the actuator to the shaft adaptor.

Alternatively or additionally to any of the examples above, in another example, the ring of the outer jaw may be positioned between the first and second plates of the housing.

Alternatively or additionally to any of the examples above, in another example, at least part of the outer jaw may be positioned between the second plate of the inner jaw and the second plate of the housing.

Alternatively or additionally to any of the examples above, in another example, when the elongate member of the outer jaw extends through the apertures in the third plates of the housing and the inner jaw, the inner jaw may be held in place relative to the housing.

Alternatively or additionally to any of the examples above, in another example, the clamping mechanism may be threadably engaged with the elongate member of the outer jaw.

Alternatively or additionally to any of the examples above, in another example, the elongate member of the outer jaw may comprise a threaded region and the clamping mechanism is threadably engaged with the threaded region of the elongate member.

In another example, a shaft adaptor may be configured to couple an output drive member of an HVAC actuator with an input drive member of an HVAC component. The shaft adaptor may comprise a clamp for selectively clamping onto an input drive member of a HVAC component, a drive interface configured to form an interference fit with an output drive member of a HVAC actuator, and a bracket configured to mechanically couple the drive interface and the clamp such that rotational movement of the drive interface by way of the interference fit with the output drive member of the HVAC actuator causes corresponding rotational movement of the clamp and thus the input drive member of the HVAC component.

Alternatively or additionally to any of the examples above, in another example, the bracket may be configured to hold the clamp and the drive interface in a spaced apart relationship resulting in a gap between the clamp and the drive interface.

Alternatively or additionally to any of the examples above, in another example, when connected the output drive member of the HVAC actuator may be configured to extend into the gap between the clamp and the drive interface but not to the clamp, and when connected the input drive member of the HVAC component may be configured to extend into the gap between the clamp and the drive interface but not to the drive interface.

Alternatively or additionally to any of the examples above, in another example, the shaft adaptor may further comprise a clip that is positioned in the gap to engage the output drive member of the HVAC actuator to hold the output drive member of the HVAC actuator in place relative to the drive interface.

Alternatively or additionally to any of the examples above, in another example, the bracket may comprise a U-shaped bracket with two spaced legs, wherein a first one of the two spaced legs mechanically supports the clamp and a second one of the two spaced legs mechanically supports the drive interface.

Alternatively or additionally to any of the examples above, in another example, the drive interface may comprise an aperture in the second one of the two spaced legs, wherein the aperture may be defined by an aperture defining wall, wherein the aperture defining wall comprises splines that are configured to mate with splines on an outer surface of the output drive member of an HVAC actuator.

Alternatively or additionally to any of the examples above, in another example, the drive interface may comprise an aperture defined by an aperture defining wall, wherein the aperture defining wall comprises splines that are configured to mate with splines on an outer surface of the output drive member of an HVAC actuator.

Alternatively or additionally to any of the examples above, in another example, the clamp may be configured to receive the input drive member of the HVAC component along a clamp axis, and the drive interface is configured to receive the output drive member of the HVAC actuator along a drive interface axis, wherein the clamp axis and the drive interface axis are parallel to one another.

Alternatively or additionally to any of the examples above, in another example, the clamp axis and the drive interface axis may be co-axial.

In another example, a shaft adaptor may be configured to couple an output drive member of an actuator with an input drive member of a component. The shaft adaptor may comprise a clamp for selectively clamping onto an input drive member of a component, a drive interface configured to form an interference fit with an output drive member of an actuator, and a housing configured to mechanically couple the drive interface and the clamp. The housing may comprise a U shaped bracket with two spaced legs connected by a support, wherein a first one of the two spaced legs mechanically supports the clamp and a second one of the two spaced legs mechanically supports the drive interface. The clamp comprises a U shaped bracket with two spaced legs connected by a support, wherein a first one of the two spaced legs of the U shaped bracket of the clamp extends through an opening in the support of the U shaped bracket of the housing and between the two spaced legs of the U shaped bracket of the housing, and a second one of the two spaced legs of the U shaped bracket of the clamp extends along an outer side of the second one of the two spaced legs of the U shaped bracket of the housing. The clamp may further comprise an outer jaw that extends between the first one of the two spaced legs of the U shaped bracket of the clamp and the second one of the two spaced legs of the U shaped bracket of the housing and through the opening in the support of the U shaped bracket of the housing and through an opening in the support of the U shaped bracket of the clamp Alternatively or additionally to any of the examples above, in another example, the second one of the two spaced legs of the U shaped bracket of the clamp may include one or more features that extends into an opening in the second one of the two spaced legs of the U shaped bracket of the housing.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. A shaft adaptor configured to mechanically couple an output drive member of an actuator with an input drive member of a component, the shaft adaptor comprising:
    a housing comprising:
        a first plate, wherein the first plate includes an aperture;
        a second plate spaced from the first plate; and
        a third plate interconnecting the first plate and the second plate, wherein the third plate includes an aperture;
    an inner jaw releasably coupled to the housing, the inner jaw comprising:
        a first plate including a side arm;
        a second plate spaced from the first plate, wherein the second plate of the inner jaw extends through the aperture in the third plate of the housing and between the first plate and the second plate of the housing, and wherein the first plate of the inner jaw extends along an outer side of the first plate of the housing;
        a third plate interconnecting the first plate and the second plate of the inner jaw, the third plate of the inner jaw includes an aperture;
        wherein the side arm of the first plate of the inner jaw extends toward the first plate of the inner jaw and into the aperture in the first plate of the housing;
    an outer jaw comprising:
        a ring;
        an elongate member extending from the ring, wherein the elongate member is configured to extend through the aperture in the third plate of the inner jaw and through the aperture in the third plate of the housing; and
        a clamping mechanism configured to move the outer jaw relative to the inner jaw when manipulated by a user.

2. The shaft adaptor of claim 1, wherein the first plate and the second plate of the housing each define a receiving aperture, wherein the receiving aperture of the first plate of the housing is configured to receive the input drive member of the component, and the receiving aperture of the second plate is configured to receive the output drive member of the actuator.

3. The shaft adaptor of claim 2, wherein the receiving aperture in the second plate of the housing comprises a plurality of splines configured to engage a plurality of splines on an output drive member of the actuator.

4. The shaft adaptor of claim 2, further comprising a removable clip configured to releasably secure the output drive member of the actuator to the shaft adaptor.

5. The shaft adaptor of claim 1, wherein the ring of the outer jaw is positioned between the first and second plates of the housing.

6. The shaft adaptor of claim 5, wherein at least part of the outer jaw is positioned between the second plate of the inner jaw and the second plate of the housing.

7. The shaft adaptor of claim 6, wherein when the elongate member of the outer jaw extends through the apertures in the third plates of the housing and the inner jaw, the inner jaw is held in place relative to the housing.

8. The shaft adaptor of claim 1, wherein the clamping mechanism is threadably engaged with the elongate member of the outer jaw.

9. The shaft adaptor of claim 8, wherein the elongate member of the outer jaw comprises a threaded region and the clamping mechanism is threadably engaged with the threaded region of the elongate member.

10. A shaft adaptor configured to couple an output drive member of an HVAC actuator with an input drive member of an HVAC component, the shaft adaptor comprising:
    a clamp for selectively clamping onto the input drive member of a HVAC component;
    a drive interface configured to form an interference fit with the output drive member of a HVAC actuator, wherein the drive interface comprises an aperture defined by an aperture defining wall, wherein the aperture defining wall comprises splines that are configured to mate with splines on an outer surface of the output drive member of an HVAC actuator; and
    a bracket configured to mechanically couple the drive interface and the clamp such that rotational movement of the drive interface by way of the interference fit with the output drive member of the HVAC actuator causes corresponding rotational movement of the clamp and thus the input drive member of the HVAC component.

11. The shaft adaptor of claim 10, wherein the clamp is configured to receive the input drive member of the HVAC component along a clamp axis, and the drive interface is configured to receive the output drive member of the HVAC actuator along a drive interface axis, wherein the clamp axis and the drive interface axis are parallel to one another.

12. The shaft adaptor of claim 11, wherein the clamp axis and the drive interface axis are co-axial.

13. A shaft adaptor configured to couple an output drive member of an HVAC actuator with an input drive member of an HVAC component, the shaft adaptor comprising:
    a clamp for selectively clamping onto the input drive member of a HVAC component;
    a drive interface configured to form an interference fit with the output drive member of a HVAC actuator;
    a bracket configured to mechanically couple the drive interface and the clamp such that rotational movement of the drive interface by way of the interference fit with the output drive member of the HVAC actuator causes corresponding rotational movement of the clamp and thus the input drive member of the HVAC component;

wherein the bracket is configured to hold the clamp and the drive interface in a spaced apart relationship resulting in a gap between the clamp and the drive interface;

wherein, when connected, the output drive member of the HVAC actuator is configured to extend into the gap between the clamp and the drive interface but not to the clamp, and when connected, the input drive member of the HVAC component is configured to extend into the gap between the clamp and the drive interface but not to the drive interface; and a clip that is positioned in the gap to engage the output drive member of the HVAC actuator to hold the output drive member of the HVAC actuator in place relative to the drive interface.

14. A shaft adaptor configured to couple an output drive member of an HVAC actuator with an input drive member of an HVAC component, the shaft adaptor comprising:

a clamp for selectively clamping onto the input drive member of a HVAC component;

a drive interface configured to form an interference fit with the output drive member of a HVAC actuator;

a bracket configured to mechanically couple the drive interface and the clamp such that rotational movement of the drive interface by way of the interference fit with the output drive member of the HVAC actuator causes corresponding rotational movement of the clamp and thus the input drive member of the HVAC component;

wherein the bracket comprises a U-shaped bracket with two spaced legs, wherein a first one of the two spaced legs mechanically supports the clamp and a second one of the two spaced legs mechanically supports the drive interface; and wherein the drive interface comprises an aperture in the second one of the two spaced legs, wherein the aperture is defined by an aperture defining wall, wherein the aperture defining wall comprises splines that are configured to mate with splines on an outer surface of the output drive member of an HVAC actuator.

15. A shaft adaptor configured to couple an output drive member of an actuator with an input drive member of a component, the shaft adaptor comprising:

a clamp for selectively clamping onto the input drive member of a component;

a drive interface configured to form an interference fit with the output drive member of an actuator; and a housing configured to mechanically couple the drive interface and the clamp, wherein the housing comprises a U shaped bracket with two spaced legs connected by a support, wherein a first one of the two spaced legs mechanically supports the clamp and a second one of the two spaced legs mechanically supports the drive interface; and wherein the clamp comprises a U shaped bracket with two spaced legs connected by a support, wherein a first one of the two spaced legs of the U shaped bracket of the clamp extends through an opening in the support of the U shaped bracket of the housing and between the two spaced legs of the U shaped bracket of the housing, and a second one of the two spaced legs of the U shaped bracket of the clamp extends along an outer side of the first one of the two spaced legs of the U shaped bracket of the housing, the clamp further comprising an outer jaw that extends between the first one of the two spaced legs of the U shaped bracket of the clamp and the first one of the two spaced legs of the U shaped bracket of the housing and through the opening in the support of the U shaped bracket of the housing and through an opening in the support of the U shaped bracket of the clamp.

16. The shaft adaptor of claim 15, wherein the second one of the two spaced legs of the U shaped bracket of the clamp includes one or more features that extends into an opening in the first one of the two spaced legs of the U shaped bracket of the housing.

* * * * *